United States Patent
Smith

(10) Patent No.: US 7,104,500 B1
(45) Date of Patent: Sep. 12, 2006

(54) THRUST REVERSER WITH SLIDING PIVOT JOINTS

(75) Inventor: Craig M. Smith, San Antonio, TX (US)

(73) Assignee: Aircraft Integration Resources, Inc., San Antonio, TX (US)

( * ) Notice: Subject to any disclaimer, the term of this patent is extended or adjusted under 35 U.S.C. 154(b) by 0 days.

(21) Appl. No.: 11/037,744

(22) Filed: Jan. 18, 2005

Related U.S. Application Data

(62) Division of application No. 09/909,561, filed on Jul. 20, 2001, now Pat. No. 6,845,945.

(51) Int. Cl.
 *B64C 25/68* (2006.01)
(52) U.S. Cl. .............................. 244/110 B; 239/265.19; 239/265.29; 60/226.2; 60/230
(58) Field of Classification Search ............ 244/110 B; 239/265.19, 265.29; 60/226.2, 230
 See application file for complete search history.

(56) References Cited

U.S. PATENT DOCUMENTS

| | | | |
|---|---|---|---|
| 4,005,836 A | 2/1977 | Mutch | |
| 4,860,956 A | 8/1989 | Fage | |
| 4,966,327 A | 10/1990 | Fage et al. | |
| 5,097,661 A | 3/1992 | Lair et al. | |
| 5,189,527 A * | 2/1993 | Matsuda et al. | 358/440 |
| 5,192,023 A | 3/1993 | Fage et al. | |
| 5,197,693 A | 3/1993 | Remlaoui | |
| 5,310,117 A | 5/1994 | Fage et al. | |
| 5,372,006 A | 12/1994 | Lair | |
| 5,419,515 A | 5/1995 | Lair | |
| 5,615,834 A | 4/1997 | Osman | |
| 5,720,449 A * | 2/1998 | Laboure et al. | 244/110 B |
| 5,730,392 A | 3/1998 | Lair | |
| 6,145,301 A | 11/2000 | Gonidec et al. | |
| 6,260,801 B1 | 7/2001 | Peters et al. | |

\* cited by examiner

*Primary Examiner*—J. Woodrow Eldred
(74) *Attorney, Agent, or Firm*—Cox Smith Matthews Incorporated

(57) ABSTRACT

A target type thrust reverser is provided for reversing the thrust of jet engines, particularly on aircraft. The thrust reverser preferably has a plurality of doors that occupy a stowed position about the nozzle of the jet engine until deployed. In the stowed position, the doors are out of the exhaust stream of the jet engine. The doors are mounted to pivot joints on the rear portions of the doors. To deploy the thrust reverser, actuators connected to the pivot joints cause the pivot joints to translate linearly aft, and link rods attached to the forward portions of the doors cause the doors to pivot about the sliding pivot joints. In this manner, the distance between the doors and the engine exhaust nozzle is minimized during deployment, which enables significant weight savings due to reduced loads and fewer parts. A novel lock is also provided for simultaneously locking the thrust reverser doors and the actuators.

12 Claims, 10 Drawing Sheets

THRUST REVERSER WITH SLIDING PIVOT JOINTS

CROSS-REFERENCE TO RELATED APPLICATIONS

This application is a divisional of U.S. patent application No. 09/909,561, filed Jul. 20, 2001 now U.S. Pat. No. 6,845,945, the full disclosure of which is incorporated herein by reference.

BACKGROUND OF THE INVENTION

1. Field of the Invention

This invention relates generally to thrust reversers for jet engines, and more particularly to a target type thrust reverser in which the doors are mounted to sliding pivot joints.

2. Description of the Related Art

In the field of jet engines, and particularly in the field of jet aircraft engines, it frequently becomes advantageous to reverse the thrust of the engine in order to supply a braking force to the structure to which the engine is attached. On jet aircraft, thrust reversers are typically used to shorten the distance that the aircraft travels on the runway after landing and to enhance safety when braking the aircraft on a damp or icy runway. Various types of thrust reversers have been developed for such purposes.

In general, thrust reversers fall into one of two categories: (1) fan only reversers, which reverse only the fan bypass stream but not the core engine exhaust, and (2) full jet reversers, which reverse most of the core engine exhaust as well as the fan bypass stream. Thrust reversers in the latter category are sometimes referred to as "target" type reversers because they involve thrust reverser doors that are deployed into the engine exhaust stream aft of the exit plane to form a target onto which substantially the entire engine exhaust stream impinges.

An example of a fan only reverser is shown in U.S. Pat. No. 5,197,693, issued to Remlaoui on Mar. 30, 1993 ("Remlaoui"). The Remlaoui reverser comprises a plurality of blocker doors that are mounted on sliding hinges about the periphery of the engine nacelle and that are actuated by extensible rods. In their stowed positions, the blocker doors form a streamlined part of the annular duct through which fan air passes outside the engine core. As the extensible rods are actuated, the blocker doors are rotated into the duct to divert the fan airstream out of the nacelle in a forward direction. Because fan only reversers are capable of reversing only the fan air and not the core engine exhaust, fan only reversers are not capable of providing as much reverse thrust as a full jet thrust reverser.

One of the most common types of target thrust reversers is a four-bar link system such as that disclosed in U.S. Pat. No. 4,005,836, issued to Mutch on Feb. 1, 1977 ("Mutch"). In a four-bar link system, each one of a pair of doors is mounted to the engine with four bars—two bars (one forward and one aft) on each side of the door. Each bar has one end pinned to the engine structure and the other end pinned to the door. The pin connections at the respective ends of the forward bars are on a common axis that runs transverse to the engine axis, and likewise the pin connections at the respective ends of the aft bars are on a common axis that runs transverse to the engine axis. Because the forward bars are longer than the aft bars, the four bars cooperate to allow the door to both rotate and translate as the bars are pivoted about the points that are pinned to the engine structure. The doors are thus capable of movement between a stowed position, in which the doors lie adjacent the engine nozzle out of the exhaust stream, and a deployed position, in which the doors are disposed within the exhaust stream aft of the engine exit. Although a four-bar link system such as that disclosed in Mutch reverses substantially all of the engine exhaust and therefore provides considerably more reverse thrust than a fan only thrust reverser, a four-bar link system has the drawback of increased weight because the structure must be quite heavy in order to carry the increased forces and moments that the system generates. The forces are greater because the doors divert a much greater volume of air, and the moments are greater because the bars place the doors at a significant distance away from the pivot joints. Additionally, the four bars constitute extra moving parts that add an extra level of complication and cost.

Thus, it would be a significant advancement in the art to provide a jet engine thrust reverser that has a large thrust reversal capacity, reduced weight, simple operation, improved reliability, and reduced cost.

SUMMARY OF THE INVENTION

To solve the aforementioned and other problems, a thrust reverser in accordance with the present invention preferably comprises a plurality of doors mounted to pivot joints near the aft portions of the doors. Link rods, which may be pivoting, folding, or extensible, are provided near the forward portions of the doors. An actuator is preferably provided between each door, and slider rods on each actuator are connected to the pivot joint of the door on either side of the actuator. In the stowed position, the doors are located about the periphery of the engine exhaust nozzle out of the exhaust stream. To deploy the thrust reverser, the actuators cause the pivot joints to translate linearly aft, and the forward link rods cause the doors to rotate about the pivot joints. In the fully deployed position, the doors are located aft of the engine exhaust nozzle and substantially in the path of the exhaust stream. In this manner, the doors are able to reverse the flow of substantially the entire exhaust stream, including both core exhaust and bypass fan exhaust, which provides significantly improved reverse thrust. Because the present thrust reverser eliminates the rear bars of a conventional four-bar link system, the present thrust reverser provides significant weight savings, simpler operation, and increased reliability. Additionally, by keeping the rear pivot joints close to the mid-line of the engine, the present thrust reverser minimizes the distance between the doors and the engine during deployment, which results in reduced loads on the thrust reverser, which in turn allows further weight savings. The reduced loads allows the actuators to be oriented such that the full, unobstructed faces of the actuator pistons (rather than the faces to which the piston rods are attached, which have reduced surface area) may be used to return the doors from the deployed position to the stowed position, which improves safety and allows smaller actuators with reduced weight. Additionally, a thrust reverser in accordance with the present invention preferably comprises a lock that simultaneously locks the thrust reverser doors and the actuators.

It is an object of the present invention to provide an improved target thrust reverser for jet engines that reverses substantially the entire exhaust stream, including both core exhaust and bypass fan exhaust.

It is a further object of the present invention to provide an improved target thrust reverser with doors mounted to pivot joints that translate linearly aft near the midline of the engine in order to minimize the distance between the doors and the engine during deployment and thereby produce reduced loads in the thrust reverser.

It is another object of this invention to provide an improved target thrust reverser with reduced weight due to fewer parts and reduced mass of the remaining parts due to reduced operating loads.

It is another object of this invention to provide an improved target thrust reverser with simpler and more reliable operation and reduced cost.

Further objects and advantages of the present invention will be readily apparent to those skilled in the art from the following detailed description taken in conjunction with the annexed sheets of drawings, which illustrate a preferred embodiment of the invention.

DETAILED DESCRIPTION OF A PREFERRED EMBODIMENT

Figure 1:
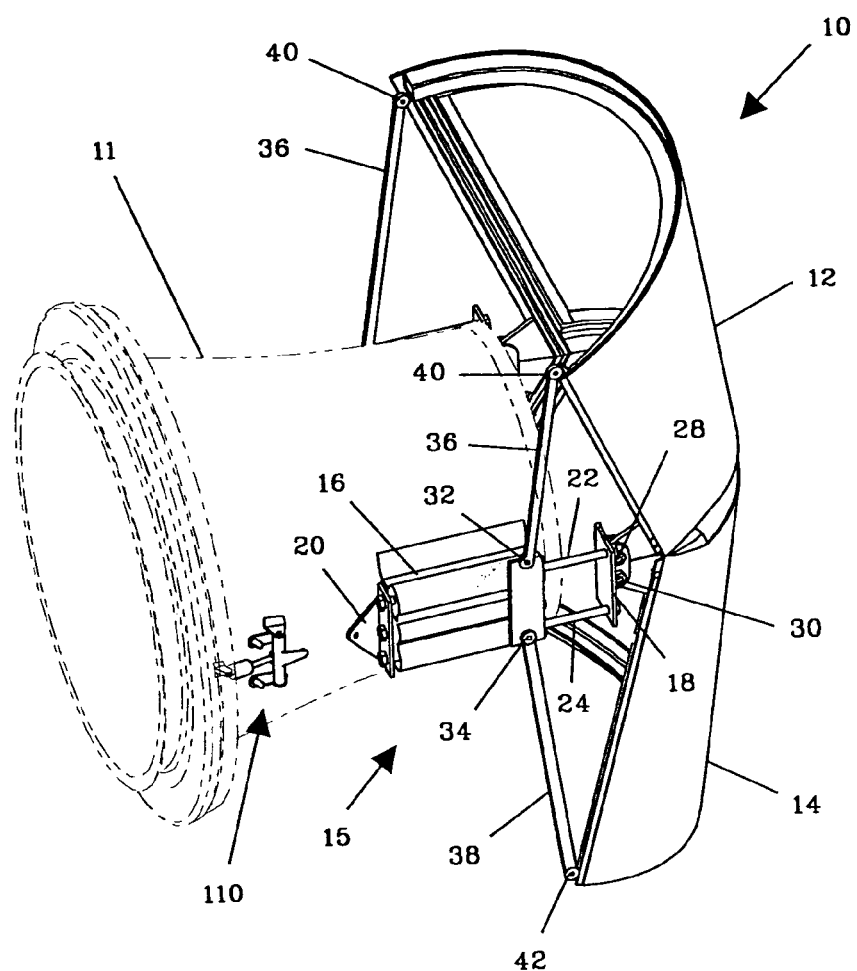
FIG. 1 is a perspective view of a thrust reverser in accordance with the present invention shown in a fully deployed position.
Figure 2:
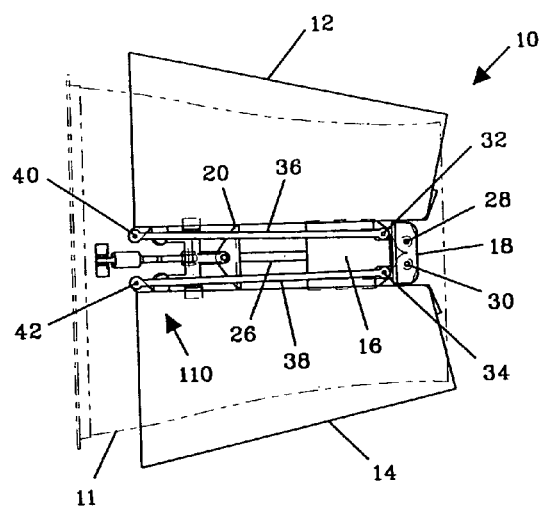
FIG. 2 is a side elevational view of the thrust reverser of FIG. 1 shown in a stowed position.
Figure 3:
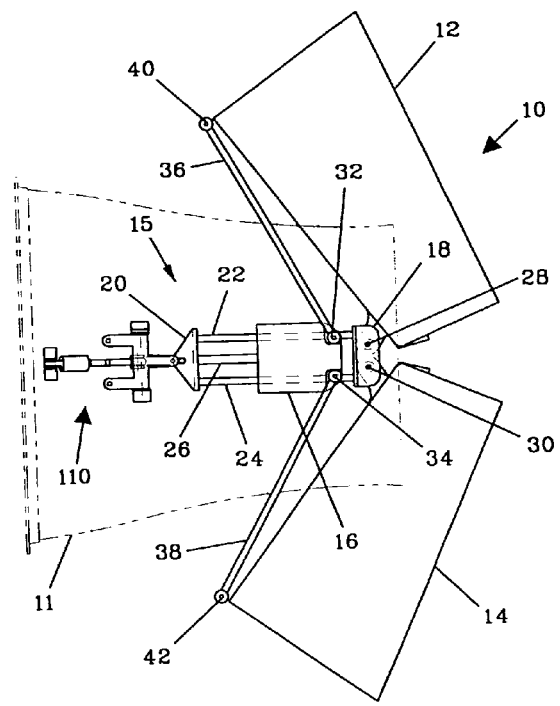
FIG. 3 is a side elevational view of the thrust reverser of FIG. 1 shown in a partially deployed position.
Figure 4:
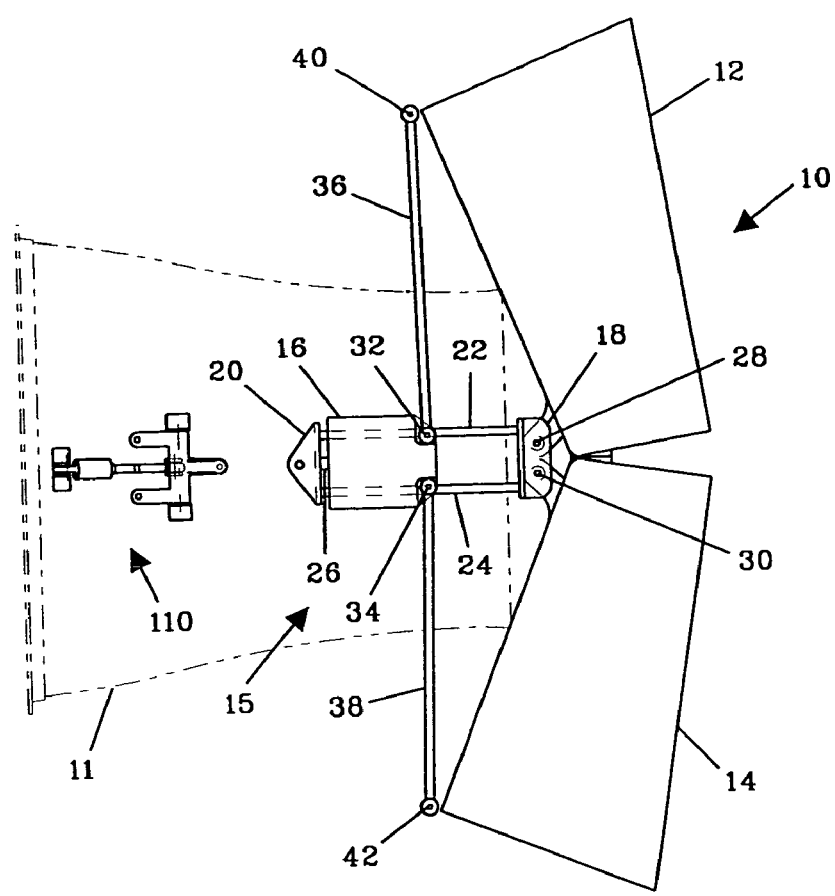
FIG. 4 is a side elevational view of the thrust reverser of FIG. 1 shown in a fully deployed position.

Referring to FIGS. 1–4, a thrust reverser 10 in accordance with the present invention preferably comprises a pair of doors 12 and 14 mounted to the exit nozzle 11 of a jet engine with an actuator assembly 15 on each side of nozzle 11. Each actuator assembly 15 preferably comprises a combined actuator and guide body 16, which is fixedly attached to nozzle 11. Each actuator/guide body 16 preferably comprises a conventional hydraulic or pneumatic actuator, although the actuator may be powered by other means such as electricity. On each side of door 12, a link rod 36 is pinned to the forward portion of door 12 at pin connection 40, and link rod 36 is pinned to actuator/guide body 16 at pin connection 32. Likewise, on each side of door 14, a link rod 38 is pinned to the forward portion of door 14 at pin connection 42, and link rod 38 is pinned to actuator/guide body 16 at pin connection 34. Although pin connections 32 and 34 are indicated as being fixed to actuator/guide body 16, pin connections 32 and 34 may be fixed to other stationary structure on the engine, such as nozzle 11. The rear portion of door 12 is pinned on each side to an aft fitting 18 at a pivot joint 28. Similarly, the rear portion of door 14 is pinned on each side to an aft fitting 18 at a pivot joint 30. Alternatively, doors 12 and 14 could be pinned on each side to a common pivot joint on each aft fitting. Each aft fitting 18 is mounted to a pair of slider rods 22, 24 that are slidably mounted in actuator/guide body 16. The forward ends of slider rods 22, 24 are attached to a forward fitting 20. Actuator/guide body 16 has a piston rod 26, which is also attached to forward fitting 20. As the actuator is activated from the stowed position shown in FIG. 2, piston rod 26 pulls fitting 20 rearward, which forces fitting 18 rearward because of the connection through slider rods 22, 24. As fitting 18 translates rearward as shown in FIG. 3, door 12 rotates upward about pivot joint 28 due to the compressive load that develops in link rod 36 since pin connection 32 cannot translate, and door 14 rotates downward about pivot joint 30 due to the compressive load that develops in link rod 38 since pin connection 34 cannot translate. Such translation and rotation of doors 12, 14 continues until the actuator reaches the end of its stroke and thrust reverser 10 is placed in its fully deployed position as shown in FIG. 4.

In the fully deployed position shown in FIG. 4, thrust reverser 10 redirects substantially all of both the core and the fan exhaust gases from nozzle 11 in a forward direction, which provides improved reverse thrust for the aircraft to which thrust reverser 10 is mounted. Because thrust reverser 10 has only two pairs of link bars (36 and 38) rather than four pairs, thrust reverser 10 provides significant weight savings as compared to a conventional four-bar link system, which is always a paramount concern in aircraft design. Also, the elimination of the rear pair of links makes thrust reverser 10 more stable and simpler to operate than a conventional four-bar link system, which increases reliability and reduces maintenance costs. Additionally, because pivot joints 28 and 30 constrain doors 12 and 14, respectively, to rotate about axes that are near the centerline of nozzle 11, the distance between doors 12 and 14 and nozzle 11 during deployment is minimized, which minimizes the loads in actuator/guide body 16, which in turn allows for further weight savings. Because doors 12 and 14, pivot joints 28 and 30, and link rods 36 and 38 do not attach directly to the actuator piston rod 26, the piston rod 26 reacts only to linear loads and not side or asymmetric loads, which reduces wear on the actuator seals and bearings, increases the service life of the actuator, and reduces the likelihood of leakage and the need for maintenance.

Figure 5:
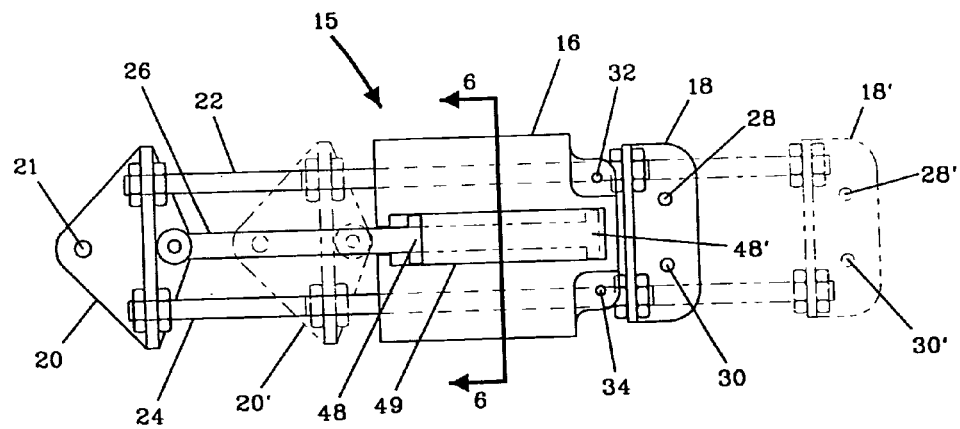
FIG. 5 is a side elevational view of the actuator for the thrust reverser of FIG. 1.
Figure 6:
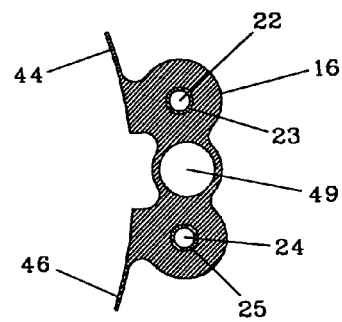
FIG. 6 is a sectional view of the actuator of FIG. 5 taken along line 6—6.

The reduction in operating loads for thrust reverser 10 also allows a more advantageous configuration for actuator assembly 15. As shown in FIG. 5, actuator assembly 15 preferably comprises a combined actuator/guide body 16 having an actuator cylinder 49 in which a piston 48 is slidably disposed. Piston 48 is connected to a piston rod 26, which actuates forward fitting 20 due to changes in pressure of a pressurized fluid (not shown) acting on piston 48 within cylinder 49 according to principles well known in the art. As shown in FIG. 6, actuator/guide body 16 also has a pair of guide cylinders 23, 25 in which slider rods 22, 24, respectively, are slidably disposed. Actuator/guide body 16 is preferably attached to nozzle 11 at mounting tabs 44, 46. As noted above, slider rods 22, 24 are connected to aft fitting 18 and forward fitting 20, which together translate between a stowed position indicated at 18, 20 and a deployed position indicated at 18', 20' as piston 48 moves from its forward (stowed) position indicated at 48 to its aft (deployed) position indicated at 48'. Pivot joints 28, 30 thus translate from a forward (stowed) position indicated at 28, 30 to an aft (deployed) position indicated at 28', 30'. This preferred arrangement of actuator assembly 15 provides increased safety and efficiency because the full area of the aft face of piston 48 is acted on by the pressurized fluid in cylinder 49 to return thrust reverser 10 to the stowed position rather than to deploy the thrust reverser as is the case in actuators for conventional thrust reversers. Thus, if thrust reverser 10 is inadvertently deployed, the maximum force is available to overcome the aerodynamic loads on doors 12, 14 and return thrust reverser 10 to the stowed position. In the other direction, the forward face of piston 48, which has a reduced surface area on which the pressurized fluid may act due to the presence of piston rod 26, provides sufficient force to deploy thrust reverser 10 because the deploying process requires less force from the actuator than the stowing process since the aerodynamic loads on doors 12, 14 assist in deployment. Therefore, the size of the actuator may be smaller than otherwise would be required if piston 48 were flipped 180 degrees from the configuration shown in FIG. 5, which also saves weight.

Figure 7:
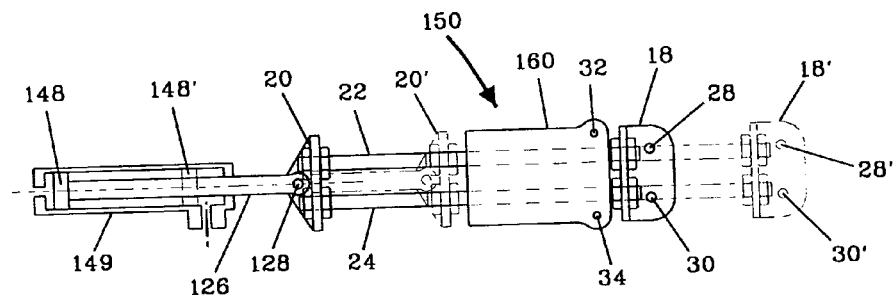
FIG. 7 is a side elevational view of an alternative actuator for the thrust reverser of FIG. 1.

An alternative actuator assembly 150 is shown in FIG. 7. In actuator assembly 150, the piston 148 and piston rod 126 are housed in an actuator cylinder 149 that is separate from the guide body 160 through which the guide rods 22, 24 pass. Forward fitting 20 and aft fitting 18 are connected to the ends of rods 22, 24 in like manner as the actuator assembly 15 of FIG. 5. In FIG. 7, however, piston 148 is flipped 180 degrees from the configuration of piston 48 in FIG. 5. Therefore, unlike actuator assembly 15 of FIG. 5, actuator assembly 150 does not achieve the advantages associated with the reduced loads of thrust reverser 10. It will be recognized that actuator assembly 15 and actuator assembly 150 may be hydraulic or pneumatic. As used in the appended claims, the term "actuator" is intended to mean any device that is capable of moving the pivot joints fore and aft.

Figure 8:
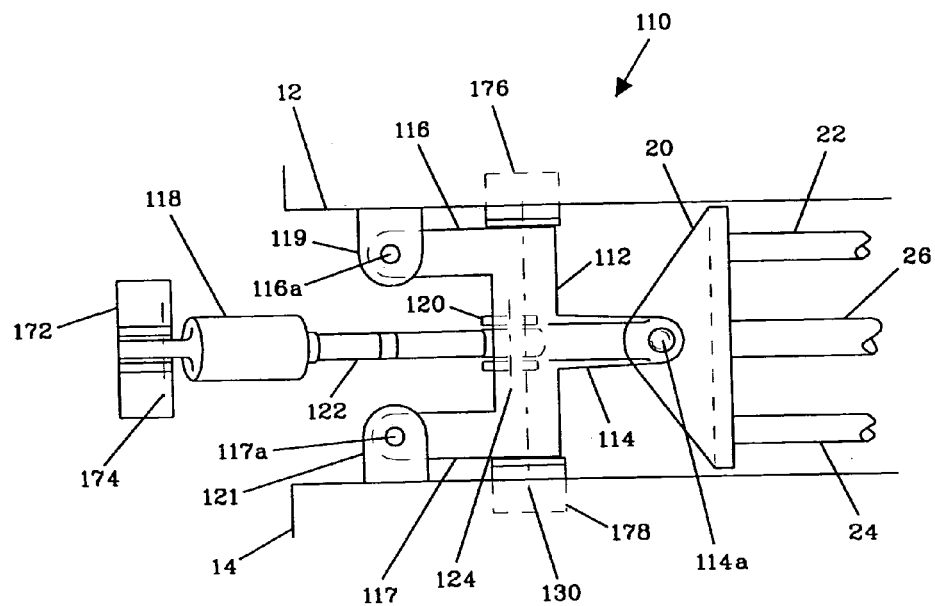
FIG. 8 is a side elevational view of the locking mechanism of FIG. 1.
Figure 9:
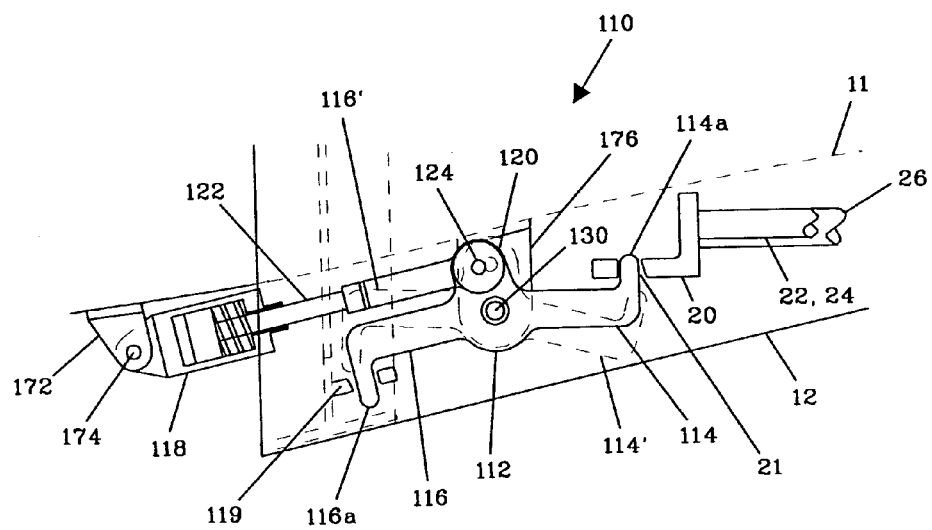
FIG. 9 is a plan view of the locking mechanism of FIG. 1.
Figure 10:
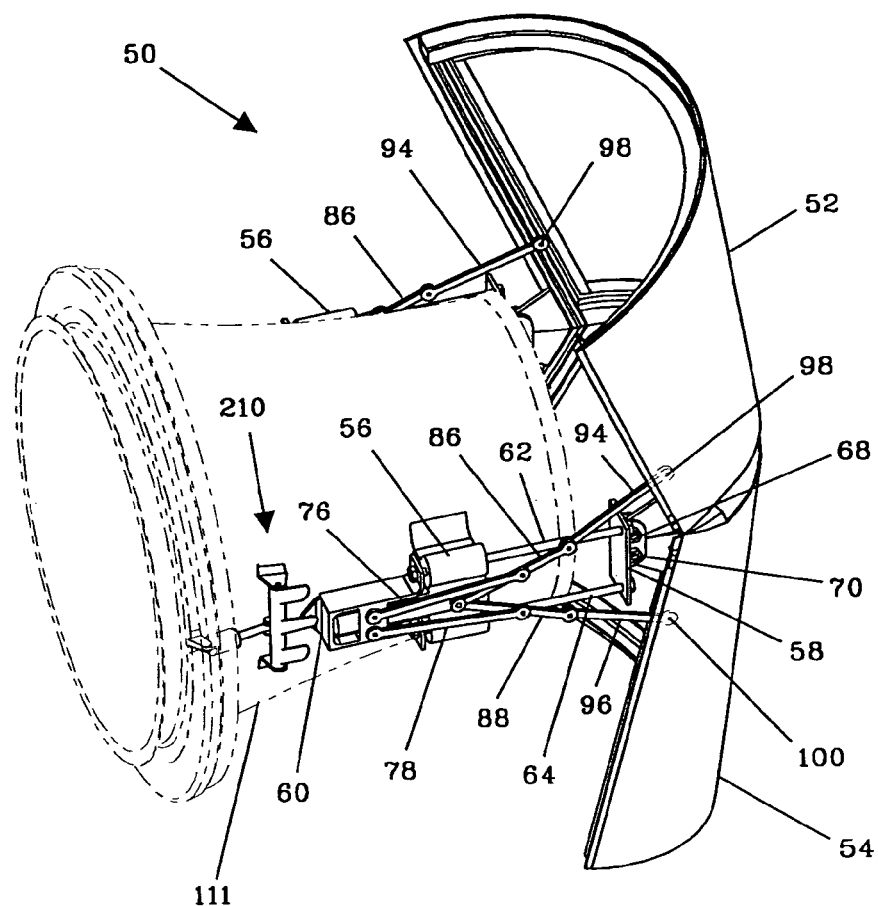
FIG. 10 is a perspective view of an alternative embodiment of a thrust reverser in accordance with the present invention.
Figure 11:
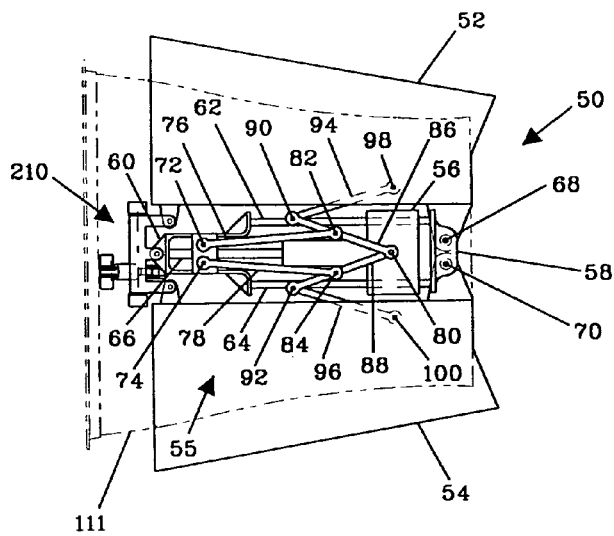
FIG. 11 is a side elevational view of the thrust reverser of FIG. 10 shown in a stowed position.

FIGS. 8 and 9 illustrate a locking mechanism 110 that serves to lock both doors 12, 14 and actuator assembly 15. Locking mechanism 110 comprises a rocker 112 having one arm 114 extending aft and two arms 116, 117 extending forward. Arms 114, 116, 117 terminate in catches 114a, 116a, 117a, respectively. Catch 114a protrudes laterally from arm 114 toward nozzle 11, and catches 116a, 117a protrude laterally from arms 116, 117, respectively, away from nozzle 11. Rocker 112 is mounted to nozzle 11 with mounts 176, 178 such that rocker 112 is capable of limited rotation about an axis 130. Rocker 112 has a boss 120 to which an actuator rod 122 is pinned at axis 124 in order to link rocker 112 to a lock actuator 118, which is pinned at axis 174 to a mount 172 that is fastened to nozzle 11. To lock doors 12 and 14 in the stowed position, actuator 118 pulls boss 120 of rocker 112 forward such that catches 116a and 117a engage corresponding recesses on tabs 119 and 121 of doors 12 and 14, respectively. Preferably, the same rotation of rocker 112 that locks doors 12 and 14 also locks the main actuator 15 by causing catch 114a to engage a corresponding recess 21 on forward fitting 20. To unlock doors 12 and 14 and allow deployment of thrust reverser 10, actuator 118 pushes boss 120 rearward such that catch 114a is disengaged from forward fitting 20 and catches 116a and 117a are disengaged from tabs 119 and 121, respectively. In FIG. 9, the locked position of rocker 112 is indicated by reference numerals 114 and 116, and the unlocked position is indicated by reference numerals 114' and 116'. Preferably, actuator 118 is biased toward the locked position, and a locking mechanism 110 is preferably provided on each side of nozzle 11 in order to provide redundancy for safety purposes. Persons skilled in the art will recognize that, if desired, locking mechanism 110 could be arranged so as to engage only doors 12 and 14 and not forward fitting 20 of actuator 15. Alternatively, locking mechanism 110 could be arranged so as to engage only forward fitting 20 of actuator 15 and not doors 12 and 14.

Figure 12:
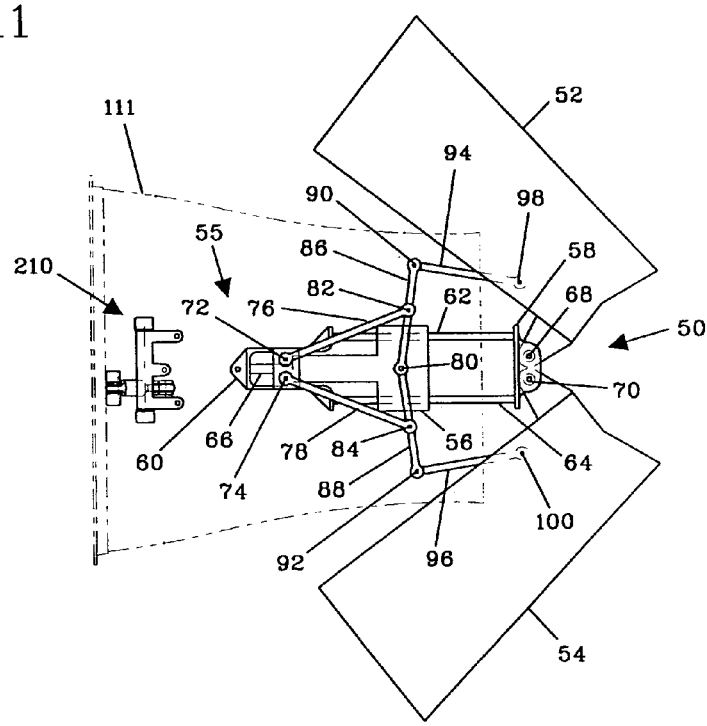
FIG. 12 is a side elevational view of the thrust reverser of FIG. 10 shown in a partially deployed position.
Figure 13:
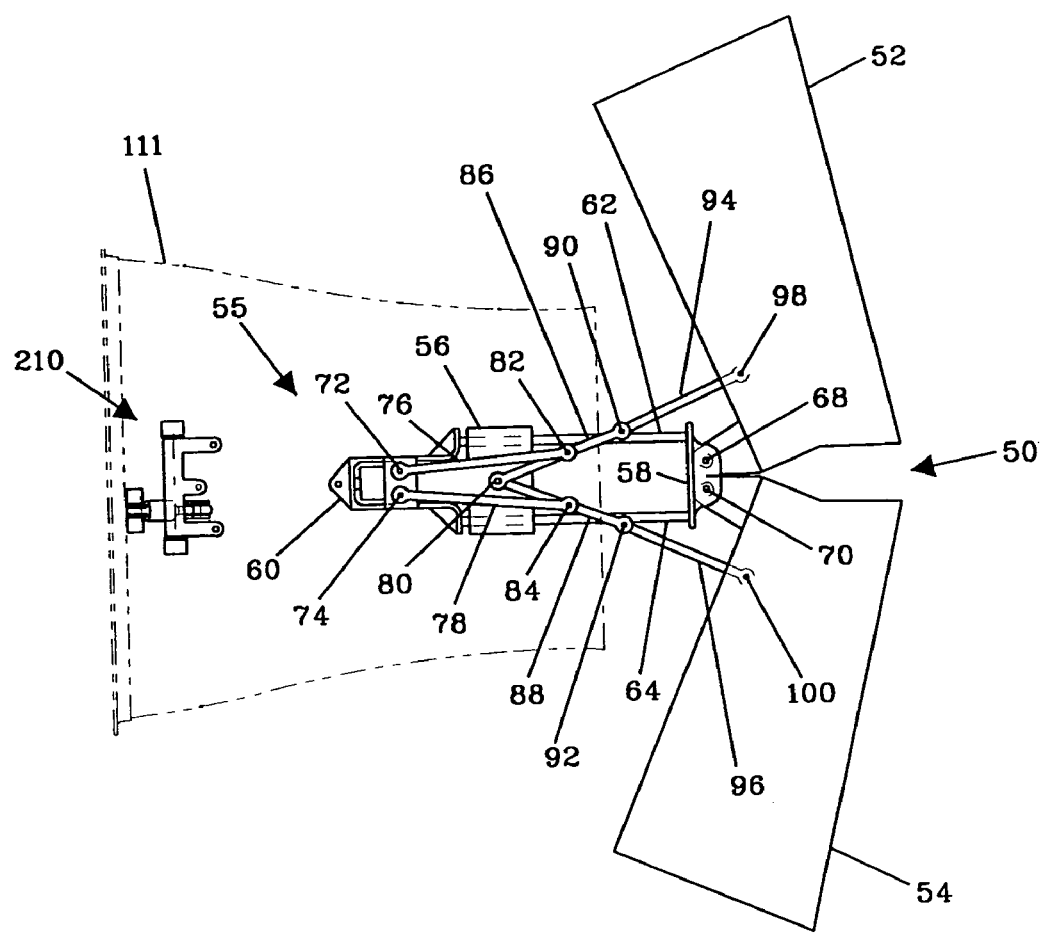
FIG. 13 is a side elevational view of the thrust reverser of FIG. 10 shown in a fully deployed position.

FIGS. 10–13 illustrate an alternative thrust reverser 50 in which link rods 36, 38 of the embodiment shown in FIGS. 1–4 are replaced by a series of folding link rods. Thrust reverser 50 comprises a pair of doors 52 and 54 mounted to the exit nozzle 111 of a jet engine with an actuator assembly 55 on each side of nozzle 111. Each actuator assembly 55 preferably comprises a combined actuator and guide body 56, which is fixedly attached to nozzle 111. Each actuator/guide body 56 preferably comprises a conventional hydraulic or pneumatic actuator, although the actuator may be powered by other means such as electricity. On each side of door 52, a rod 94 is pinned to door 52 at pin connection 98. Likewise, on each side of door 54, a rod 96 is pinned to door 54 at pin connection 100. One end of each of rods 86 and 88 is pinned to actuator/guide body 56 at pin connection 80. The other end of rod 86 is pinned to rod 94 at pin connection 90, and the other end of rod 88 is pinned to rod 96 at pin connection 92. Rods 76 and 78 are pinned to a forward fitting 60 at pin connections 72 and 74, respectively. Rods 76 and 78 are also respectively pinned to rods 86 and 88 at pin connections 82 and 84, respectively. Although pin connection 80 is indicated as being fixed to actuator/guide body 56, pin connection 80 may be fixed to other stationary structure on the engine, such as nozzle 111. The rear portion of door 52 is pinned on each side to an aft fitting 58 at a pivot joint 68. Similarly, the rear portion of door 54 is pinned on each side to aft fitting 58 at a pivot joint 70. Each aft fitting 58 is mounted to a pair of slider rods 62, 64 that are slidably mounted in actuator/guide body 56. The forward ends of slider rods 62, 64 are attached to forward fitting 60. Actuator/guide body 56 houses a piston rod 66 and piston (not shown) in a cylinder (not shown) as is well known in the art. Piston rod 66 is attached to forward fitting 60. As actuator 55 is activated from the stowed position shown in FIG. 11, piston rod 66 pulls fitting 60 rearward, which forces fitting 58 rearward because of the connection through slider rods 62, 64. As fitting 58 translates rearward as shown in FIG. 12, door 52 rotates upward about pivot joint 68 due to the interaction of rods 76, 86, and 94, and door 54 rotates downward about pivot joint 70 due to the interaction of rods 78, 88, and 96. Such translation and rotation of doors 52, 54 continues until the actuator reaches the end of its stroke and thrust reverser 50 is placed in its fully deployed position as shown in FIG. 13. Persons skilled in the art will also recognize that many other configurations of folding rods could be provided in order to pivot doors 52 and 54 about sliding pivot joints 68 and 70, respectively. Additionally, one or more of the link rods could be extensible rods, such as telescoping rods.

Comparing FIGS. 4 and 13, it will be observed that doors 52, 54 of thrust reverser 50 are ultimately positioned further aft of the exit plane of the engine nozzle than doors 12, 14 of thrust reverser 10. To achieve the particular performance requirements of a given aircraft and engine combination, thrust reverser 10 or thrust reverser 50 may be more preferable, depending on the distance at which the thrust reverser doors need to be deployed aft of the engine exit nozzle. Alternatively, thrust reverser 10 could be modified such that, upon actuation from the stowed position, pin connections 32 and 34 would initially translate aft and then hit a stop, at which point doors 12 and 14 would begin to rotate about pivot joints 28 and 30, respectively. Such a modified configuration of thrust reverser 10 would also place the thrust reverser doors further aft of the exit plane of the engine nozzle.

Figure 14:
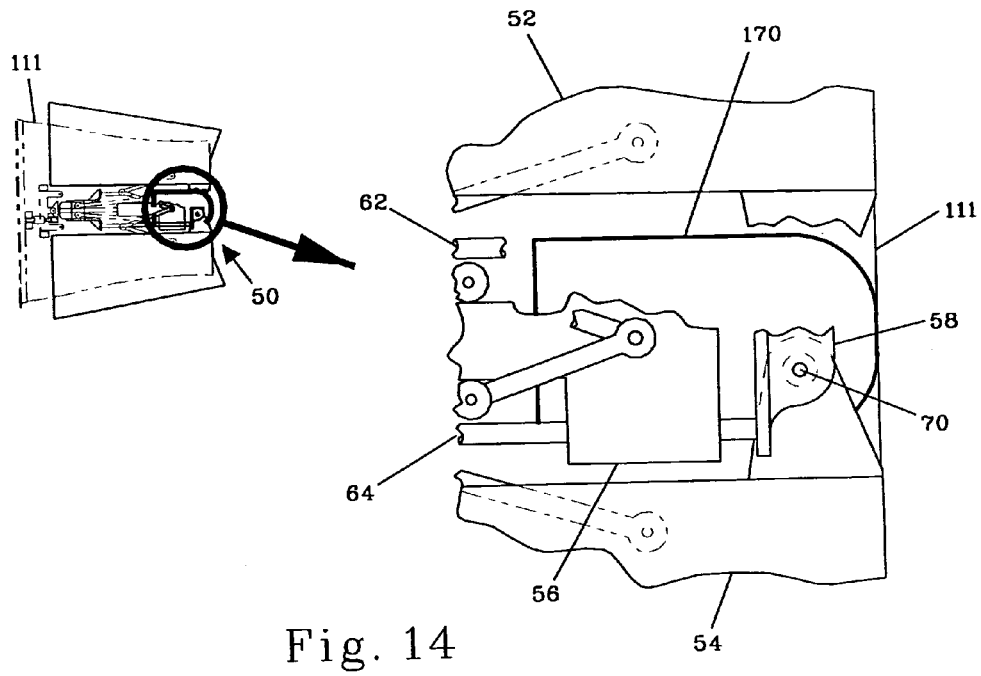
FIG. 14 is a side elevational view of the thrust reverser of FIG. 10 with an added fairing shown in a stowed position.
Figure 15:
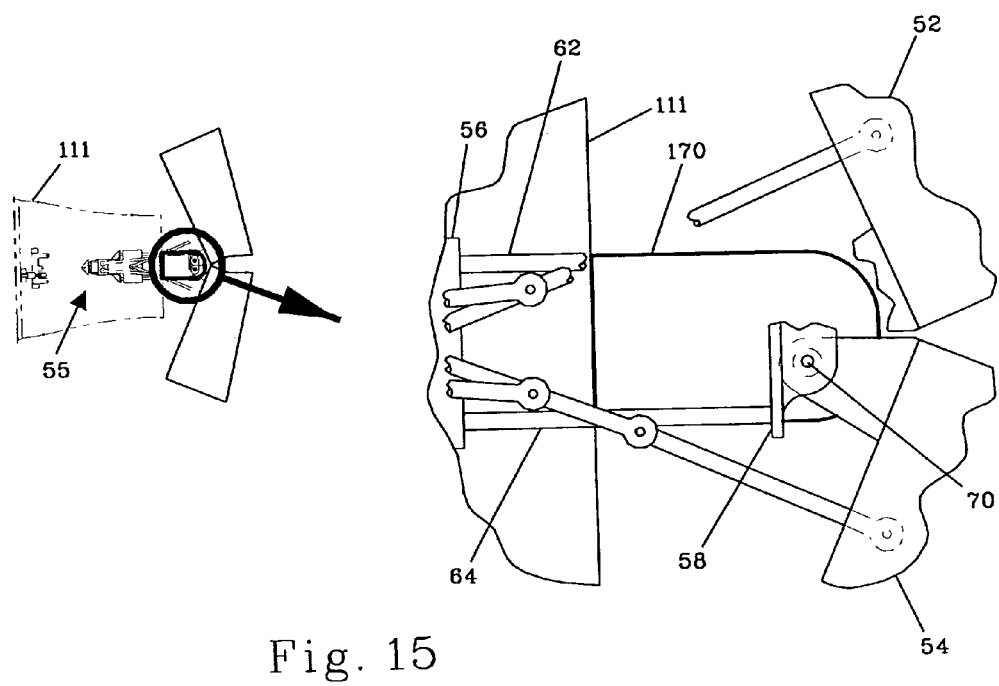
FIG. 15 is a side elevational view of the thrust reverser of FIG. 10 with an added fairing shown in a fully deployed position.

Referring to FIGS. 14 and 15, a fairing 170 is preferably attached to aft fitting 58 on each side of nozzle 111. Because fairing 170 is attached to aft fitting 58, fairing 170 travels aft as thrust reverser 50 is deployed. Fairing 170 is preferably located inboard of actuator assembly 55 and outboard of nozzle 111. Fairing 170 reduces side spill between nozzle 111 and doors 52, 54 when thrust reverser 50 is deployed, which improves the reverse thrust capability. The size and shape of fairing 170 may be aerodynamically tailored to achieve the desired amount of side spill. Likewise, it will be apparent that fairing 170 may be employed with thrust reverser 10 as well as thrust reverser 50.

Figure 16:
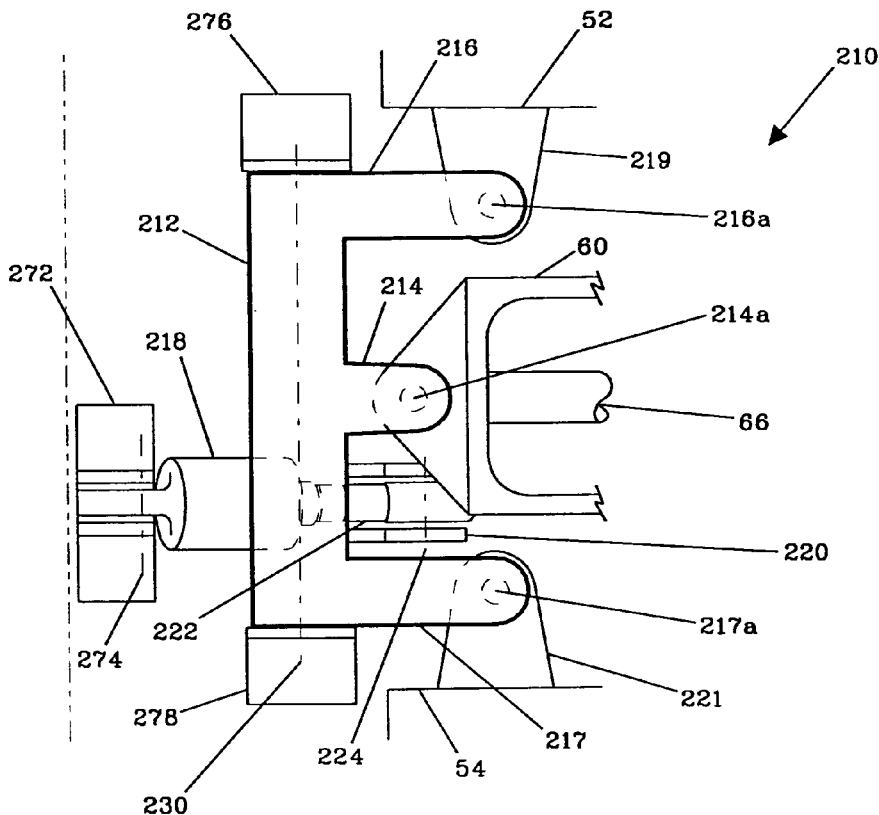
FIG. 16 is a side elevational view of the locking mechanism of FIG. 10.
Figure 17:
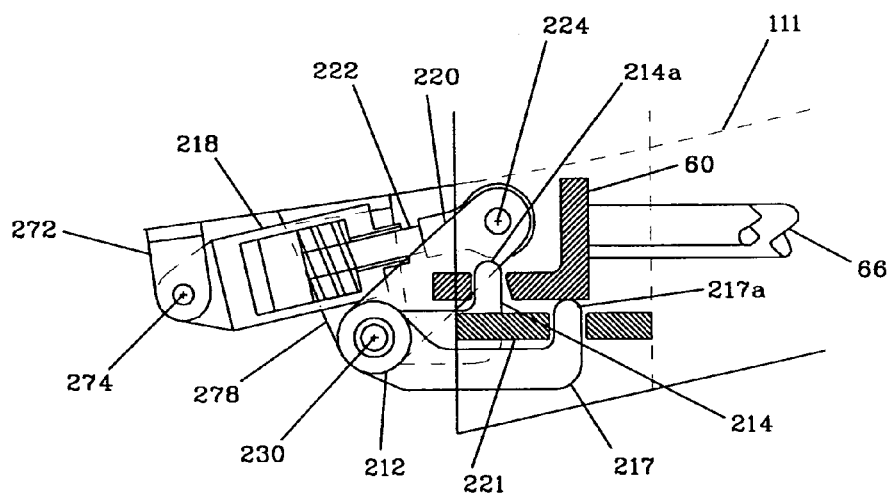
FIG. 17 is a plan view of the locking mechanism of FIG. 10.

FIGS. 16 and 17 provide a more detailed illustration of an alternative locking mechanism 210 used to lock both doors 52, 54 and actuator assembly 55. Locking mechanism 210 comprises a rocker 212 having three arms 214, 216, 217 extending aft. Arms 214, 216, 217 terminate in catches 214a, 216a, 217a, respectively, which protrude inboard toward nozzle 111. Rocker 212 is mounted to nozzle 111 with mounts 276, 278 such that rocker 212 is capable of limited rotation about an axis 230. Rocker 212 has a boss 220 to which an actuator rod 222 is pinned at axis 224 in order to link rocker 212 to a lock actuator 218, which is pinned at axis 274 to a mount 272 that is fastened to nozzle 111. To lock doors 52 and 54 in the stowed position as shown in FIGS. 16 and 17, actuator 218 pulls boss 220 of rocker 212 forward such that catches 216a and 217a engage corresponding recesses on tabs 219 and 221 of doors 52 and 54, respectively. Preferably, the same rotation of rocker 212 that locks doors 52 and 54 also locks the main actuator 55 by causing catch 214a to engage a corresponding recess on forward fitting 60. To unlock doors 52 and 54 and allow deployment of thrust reverser 50, actuator 218 pushes boss 220 rearward such that catch 214a is disengaged from forward fitting 60 and catches 216a and 217a are disengaged from tabs 219 and 221, respectively. Preferably, actuator 218 is biased toward the locked position, and a locking mechanism 210 is preferably provided on each side of nozzle 111 in order to provide redundancy for safety purposes. Persons skilled in the art will recognize that, if desired, locking mechanism 210 could be arranged so as to engage only doors 52 and 54 and not forward fitting 60 of actuator 55. Alternatively, locking mechanism 210 could be arranged so as to engage only forward fitting 60 of actuator 55 and not doors 52 and 54.

Although the preferred embodiments described herein are oriented such that each of the doors pivots about an axis that is substantially horizontal, persons skilled in the art will recognize that the present invention may be oriented such that the doors pivot about an axis that is oriented at any desired angle with respect to the engine nozzle. Furthermore, although the preferred embodiment described herein comprises a pair of symmetric doors, the present invention may be provided with non-symmetric doors. Additionally, more than two doors may be provided, and the invention is not limited to engines having exit nozzles with generally circular cross-sectional shapes. For example, the present invention could be employed on engines that have nozzles with generally rectangular cross-sectional shapes.

Although the foregoing specific details describe a preferred embodiment of this invention, persons reasonably skilled in the art will recognize that various changes may be made in the details of this invention without departing from the spirit and scope of the invention as defined in the appended claims. Therefore, it should be understood that this invention is not to be limited to the specific details shown and described herein.

I claim:

1. A lock for a thrust reverser on a jet engine, the thrust reverser having a plurality of doors and at least one door actuator for moving the plurality of doors from a stowed position in which the plurality of doors are out of the exhaust stream of the jet engine to a deployed position in which the plurality of doors are within the exhaust stream of the jet engine, said lock comprising:

a rocker pivotally mountable to the jet engine, said rocker having a plurality of arms, each of said plurality of arms having a catch for engaging one of the plurality of doors of the thrust reverser, said rocker further having a boss for attachment to a lock actuator; and a lock actuator connected to said boss of said rocker for moving said rocker between an unlocked position wherein each catch of said plurality of arms is disengageable from said plurality of doors and a locked position wherein each catch of said plurality of arms is engageable with one of the plurality of doors such that said plurality of doors is locked in the stowed position;

wherein said rocker further comprises an additional arm adaptable for locking the at least one door actuator when said rocker is in said locked position.

2. The lock of claim 1 wherein said lock actuator is biased toward said locked position.

3. A lock for a thrust reverser on a jet engine, the thrust reverser having a plurality of doors and at least one door actuator for actuating the plurality of doors, said lock comprising:

a rocker mountable to the jet engine, said rocker having a plurality of arms, each of said plurality of arms having a catch that protrudes from said rocker in a first direction; and a lock actuator connected to said rocker, said lock actuator being adaptable for rotating said rocker between an unlocked position wherein each said catch may be disengaged from the plurality of doors and a locked position wherein each said catch may be engaged with at least one of the plurality of doors.

4. The lock of claim 3 wherein said rocker further comprises an additional arm adaptable for locking the at least one door actuator when said rocker is in said locked position.

5. The lock of claim 4 wherein said additional arm comprises an additional catch that protrudes from said rocker in a second direction.

6. The lock of claim 5 wherein said second direction is substantially the same as said first direction.

7. The lock of claim 5 wherein said second direction is substantially the opposite of said first direction.

8. The lock of claim 3 wherein said lock actuator is biased toward said locked position.

9. A lock for a thrust reverser on a jet engine, the thrust reverser having a plurality of doors and at least one door actuator for actuating the plurality of doors, said lock comprising:
- a locking member mountable to the jet engine, said locking member comprising a central body and a plurality of spaced apart arms extending from said central body; and
- a lock actuator connected to said locking member, said lock actuator being adaptable for rotating said locking member between an unlocked position wherein each of said plurality of arms may be disengaged from the plurality of doors and a locked position wherein each of said plurality of arms may be engaged with at least one of the plurality of doors;
- wherein said locking member further comprises an additional arm adaptable for locking the at least one door actuator when said locking member is in said locked position.

10. The lock of claim 9 wherein said additional arm extends from said central body in a direction substantially the same as at least one of said plurality of arms.

11. The lock of claim 9 wherein said additional arm extends from said central body in a direction substantially opposite at least one of said plurality of arms.

12. A lock for a thrust reverser on a jet engine, the thrust reverser having a plurality of doors and at least one door actuator for actuating the plurality of doors, said lock comprising:
- a locking member mountable to the jet engine, said locking member comprising a central body and a plurality of spaced apart arms extending from said central body; and
- a lock actuator connected to said locking member, said lock actuator being adaptable for rotating said locking member between an unlocked position wherein each of said plurality of arms may be disengaged from the plurality of doors and a locked position wherein each of said plurality of arms may be engaged with at least one of the plurality of doors;
- wherein said plurality of arms are substantially parallel to each other.

* * * * *